Patented Dec. 14, 1943

2,336,783

UNITED STATES PATENT OFFICE 2,336,783

HYDROCARBON CONVERSION

Harold Fehrer, Nutley, N. J., assignor to Process Management Company, Inc., Wilmington, Del., a corporation of Delaware No Drawing. Application August 28, 1940,
Serial No. 354,586

7 Claims. (Cl. 260—673.5)

This invention relates to the conversion of aliphatic hydrocarbons having at least six carbon atoms per molecule to aromatic hydrocarbons by dehydrogenation and cyclization thereof.

Chromium oxide is an active catalyst for the conversion of aliphatic hydrocarbons to aromatic hydrocarbons by dehydrogenation and cyclization thereof. A particularly active form of chromium oxide for this reaction is prepared by the formation of a chromium oxide gel which can be converted to a relatively dense granular catalytic material.

I have discovered that the properties of chromium oxide as an aromatization catalyst can be enhanced materially by the incorporation therein of zirconium oxide.

In the conversion of aliphatic hydrocarbons to aromatic hydrocarbons by the use of the improved catalysts the vapors of hydrocarbons having at least six carbon atoms per molecule are passed over the catalyst at a temperature in the range of 325° to 650° C., preferably 450° to 500° C., at atmospheric, or higher, pressure. The hydrocarbons are passed over the catalyst at a space velocity which, while sufficient to effect production of aromatic hydrocarbons at a substantial rate, is sufficiently low to produce a liquid product containing a substantial proportion of aromatic hydrocarbons. In the temperature range mentioned liquid products having high percentages of aromatic constituents are associated with low space velocities, and vice versa. In this temperature range also higher percentages of aromatic constituents in the liquid products are associated generally with higher temperatures, and vice versa. At low temperatures within this range a low space velocity may be employed while at higher temperatures a higher space velocity may be used, although these factors are governed also by the character of the material treated and the nature of the product desired. In general, space velocities within the range of 0.1 to 3 volumes of aliphatic hydrocarbons (liquid basis) per volume of catalyst space per hour should be employed. Preferably, space velocities in the range of 1 to 2 volumes of liquid per volume of catalyst per hour are employed.

The mixture of chromium oxide with the zirconium oxide may be effected by any suitable means, but preferably the mixture is formed in aqueous solution, while the oxides are in a state of minute subdivision, and during or immediately following precipitation of one or more of the oxides.

The zirconium oxide should be incorporated in the catalyst in a proportion sufficient to effect the desired enhancement of the catalytic properties of the chromium oxide but not sufficiently great to change the essential character of the chromium oxide as a dehydrogenating catalyst. Generally, proportions of the zirconium oxide within the range of 5 to 20 per cent by weight, preferably 10 per cent, will be found to be satisfactory.

The invention will be described in more detail by reference to the preparation of various chromium oxide catalysts, some of which have incorporated therein suitable proportions of zirconium oxide, and the use of such catalysts for the conversion of aliphatic hydrocarbons containing at least six carbon atoms per molecule to aromatic hydrocarbons by dehydrogenation and cyclization. It will be understood, however, that the invention is not limited by reference to the specific methods of preparation or the specific conditions of operation, these being referred to merely to illustrate the invention.

These catalysts were prepared as follows:

Catalyst A 100 grams of chromium acetate (Mallinkrodt's Analytical grade) were dissolved in 500 cc. of water. 100 cc. of concentrated ammonium hydroxide solution were added with stirring at room temperature. The receptacle containing the mixture was closed and allowed to stand at room temperature for 12 hours during which time the solution was converted to a stiff black jelly. The jelly was subjected to repeated washings by decantation to the point of incipient peptization. Thereafter the product was dried for 15 hours at 120° C. and finally by raising the temperature to 350° C. over the course of 24 hours. The product was a hard, black, granular material.

Catalyst B

In the preparation of this catalyst the procedure for the preparation of Catalyst A was followed except that, after addition of the concentrated ammonium hydroxide solution, a solution of 7.2 grams of zirconium oxynitrate in 50 cc. of water was added with rapid stirring. After 12 hours precipitation of the oxides appeared to be complete.

Catalyst C 160 grams of chromium trioxide were dissolved in 2 liters of water. Eight 10 cc. portions of ethyl alcohol were added with shaking at five-minute intervals. The preparation became dark brown in color, and considerable heat was evolved. After addition of the eighth portion of alcohol the reaction mixture was permitted to stand for four hours after which 80 cc. of alcohol were added exactly as before. The reaction mixture was then boiled under reflux for 16 hours. A dark brown precipitate was formed. Thereafter 40 cc. more of alcohol were added, and boiling under reflux was resumed for 24 hours. The precipitate remained a dark brown. After filtration and drying at 120° C. the precipitate was converted to a granular material which was bluish black in color. This material was then heated slowly to 550° C. in a stream of nitrogen during which treatment the gel passed through the "glow phenomenon."

Catalyst D

This catalyst was prepared in accordance with the method of preparation of Catalyst C with the exception that gelatinous zirconium hydroxide was added to the solution during the refluxing operation in an amount sufficient to provide approximately 10 per cent of zirconium oxide in the catalyst product. The zirconium hydroxide was prepared by neutralization of a solution of zirconium oxynitrate with concentrated ammonium hydroxide. After addition of the gelatinuous precipitate thus obtained to the solution undergoing reflux the mixture was vigorously stirred for four hours to insure thorough contact of the two oxides. After cooling the final precipitate was filtered and then washed with water for the removal of the nitrate ion. The washed precipitate was dried for several days at 120° C. and then heated in a stream of nitrogen to a temperature of 550° C. to effect "glowing," as in the preparation of Catalyst C.

Catalyst E 72 grams of zirconium oxynitrate were dissolved in 1 liter of water. Concentrated ammonium hydroxide solution was added with vigorous stirring to alkalize the solution. A gelatinous precipitate was obtained which was washed by decantation. The washed material was then dried in accordance with the method employed in the preparation of Catalyst A to produce a hard granular material.

Catalysts A and B were employed under uniform conditions in the conversion of normal heptane to toluene. In these operations Catalyst A was employed as representative of an active chromium oxide catalyst, and Catalyst B was employed as representative of the catalyst of the new process. In the operations employing Catalysts A and B equal quantities of the catalysts were employed, and heptane was passed thereover at a uniform feed rate and at a temperature of 475° C. The gas produced in these operations contained 92 to 95 per cent hydrogen, the remainder being principally methane. The rate of gas production was measured, and this was taken as indication of the relative activity of the catalysts for the conversion of the heptane to toluene. The activities of the catalysts were measured also by analyses of the liquid products, taken at half-hour intervals for their content of olefinic hydrocarbons (heptene) and aromatic hydrocarbons (toluene).

The results of the operations employing Catalysts A and B are set forth in the table wherein the gas production is given in terms of relative volumes of gas.

Table

| Catalyst | Gas production | | Analysis of liquid product | | |
|---|---|---|---|---|---|
| | 1st half hr. | 2nd half hr. | Percent aromatics | Percent olefins | Period |
| A | 1,560 | 1,160 | 25.5 | 12.8 | 1st half hr. |
| | | | 38.1 | 12.2 | 1st half hr. |
| B | 2,700 | 2,200 | 26.2 | 13.8 | 2d half hr. |

The results summarized in the table indicate the superiority of the new process as exemplified by the operation employing Catalyst B. The relative volumes of gas produced indicate the superior activity of Catalyst B. This superiority is substantial at the beginning of the operations but is more pronounced as the operation proceeds because of the greater tendency of Catalyst A to decline in activity. For example, the volume of gas produced in the first half hour by Catalyst A corresponded to an aromatic content of 25.5 per cent in the liquid product for that period. The substantially reduced quantity of gas produced in the second half hour by Catalyst A indicates a substantially lower aromatic content for the liquid product of that period. The superiority of Catalyst B over Catalyst A is clearly indicated by the test results in the table, and this superiority is emphasized by the fact that the aromatic content of the product of the second half hour of the operation employing Catalyst B was greater than the aromatic content of the product of the first half hour of the operation employing Catalyst A.

Catalysts C and D also were tested for the conversion of normal heptane to toluene. In these operations uniform test conditions were employed, and equal quantities of the catalysts were used. The heptane was passed over the catalysts at a uniform rate at a temperature of 475° C. In these operations Catalyst C was representative of an active chromium oxide catalyst prepared by a method different from that of Catalyst A, and Catalyst D was representative of the improved process, employing a catalyst prepared by the method of preparation of Catalyst C but modified in accordance with the present invention. These operations indicated conclusively the superiority of Catalyst D in the conversion of heptane to toluene, as shown by the fact that the liquid product of the first hour of the operation employing Catalyst C contained approximately 33 per cent aromatic hydrocarbons (toluene) whereas the liquid product of the first hour of the operation employing Catalyst D contained over 40 per cent of aromatic hydrocarbons (toluene).

In view of the fact that chromium oxide, particularly when prepared in active form, as in the case of Catalysts A and C, is substantially superior to zirconium oxide as a dehydrogenating catalyst it is apparent that the improved results obtained in connection with the present invention are caused by some modification of the catalytic properties of the chromium oxide rather than by any additive effect of the zirconium oxide.

To illustrate the inferior activity of zirconium oxide Catalyst E was tested, under conditions identical with those employed in the testing of Catalysts C and D, in the conversion of heptane to toluene. The liquid product of the first hour of this test contained 8.2 per cent aromatic hydrocarbons (toluene).

My invention thus provides a method for converting aliphatic hydrocarbons to aromatic hydrocarbons under conditions wherein the liquid product contains a substantial amount of aromatic hydrocarbons. The new process is advantageous in the treatment of relatively pure aliphatic hydrocarbons to effect conversion thereof to corresponding aromatic hydrocarbons and also is adapted to the treatment of mixtures of liquid hydrocarbons, for example in the treatment of a paraffinic heavy naphtha to improve its anti-knock value.

In the operation of the process the improved chromium oxide catalyst may be employed in the form of the oxides of chromium and zirconium as such, or may be employed in combination with other active or inactive materials. For example, the improved catalyst may be employed in connection with suitable supporting material such as alumina.

I claim:

1. A process for the conversion of aliphatic hydrocarbons having at least six carbon atoms per molecule to aromatic hydrocarbons by dehydrogenation and cyclization thereof which comprises passing said aliphatic hydrocarbons through a reaction zone in contact with a chromium oxide catalyst containing a substantial proportion of zirconium oxide at a temperature sufficiently high and at a flow rate per unit of catalyst volume sufficiently low to effect substantial conversion of said aliphatic hydrocarbons to aromatic hydrocarbons.

2. The process in accordance with claim 1 wherein contact of said hydrocarbon with said catalyst is effected at a temperature of 450° to 500° C. and at a space velocity of less than two volumes of hydrocarbons (liquid basis) per volume of catalyst space per hour.

3. A process for the conversion of aliphatic hydrocarbons having at least six carbon atoms per molecule to aromatic hydrocarbons by dehydrogenation and cyclization thereof which comprises passing said aliphatic hydrocarbons through a reaction zone in contact with a gel-type chromium oxide catalyst modified by incorporation therein of 5 to 20 per cent of zirconium oxide at a temperature sufficiently high and at a flow rate per unit of catalyst volume sufficiently low to effect substantial conversion of said aliphatic hydrocarbons to aromatic hydrocarbons.

4. The process in accordance with claim 3 wherein the catalyst contains approximately one part by weight of said zirconium oxide for each nine parts by weight of chromium oxide.

5. A process for the conversion of aliphatic hydrocarbons having at least six carbon atoms per molecule to aromatic hydrocarbons by dehydrogenation and cyclization thereof which comprises passing said aliphatic hydrocarbons through a reaction zone in contact with a chromium oxide catalyst at a temperature sufficiently high and at a flow rate per unit of catalyst volume sufficiently low to effect conversion of said aliphatic hydrocarbons to aromatic hydrocarbons, the said chromium oxide catalyst having been modified by the incorporation therein of a substantial proportion of an oxide of zirconium whereby the catalytic properties of the chromium oxide are modified by the zirconium oxide.

6. A process for treating naphtha to effect conversion thereof to a gasoline product of improved anti-knock value which comprises passing said naphtha at elevated temperature through a reaction zone in contact with a catalyst comprising substantial proportions of chromium oxide and zirconium oxide at a temperature sufficiently high and at a flow rate per unit of catalyst volume sufficiently low to effect substantial conversion of aliphatic hydrocarbon constituents of said naphtha to aromatic hydrocarbons by dehydrogenation and cyclization thereof.

7. A process for the conversion of aliphatic hydrocarbons having at least six carbon atoms per molecule to aromatic hydrocarbons by dehydrogenation and cyclization thereof which comprises passing said aliphatic hydrocarbons through a reaction zone in contact with a catalyst comprising a mixture of chromium oxide and zirconium oxide at a temperature sufficiently high and at a flow rate per unit of catalyst volume sufficiently low to effect conversion of said aliphatic hydrocarbons to aromatic hydrocarbons, said catalyst having been prepared by a method including intimately mixing zirconium oxide with gelatinous chromium oxide prepared by reducing chromium trioxide in aqueous solution.

HAROLD FEHRER.